US008051886B2

(12) United States Patent
Tappan et al.

(10) Patent No.: US 8,051,886 B2
(45) Date of Patent: Nov. 8, 2011

(54) DISTRESSING PROCESS AND APPARATUS FOR APPLYING SUCH PROCESS

(75) Inventors: John Colhouer Tappan, Dry Fork, VA (US); Christopher Brian Tussey, Lexington, NC (US); Brian Keith Ulrich, Jamestown, NC (US)

(73) Assignee: Unilin Flooring NC LLC, Thomasville, NC (US)

( * ) Notice: Subject to any disclaimer, the term of this patent is extended or adjusted under 35 U.S.C. 154(b) by 210 days.

(21) Appl. No.: 12/637,289

(22) Filed: Dec. 14, 2009

(65) Prior Publication Data

US 2011/0139307 A1 Jun. 16, 2011

(51) Int. Cl.
*B23Q 15/00* (2006.01)
*B23Q 15/013* (2006.01)
*B27M 1/00* (2006.01)

(52) U.S. Cl. .......................... 144/356; 144/2.1; 144/3.1

(58) Field of Classification Search .................. 144/356, 144/358, 2.1, 3.1, 1.1, 242.1, 243
See application file for complete search history.

(56) References Cited

U.S. PATENT DOCUMENTS

| | | | | |
|---|---|---|---|---|
| 1,653,481 | A | 12/1927 | Spargo | |
| 2,635,653 | A | 4/1953 | Hennell | |
| 2,695,857 | A | 11/1954 | Lewis et al. | |
| 3,654,044 | A | 4/1972 | Hirota | |
| 3,756,295 | A * | 9/1973 | Halop | 144/4.1 |
| 5,271,699 | A | 12/1993 | Barre et al. | |
| 6,660,333 | B2 * | 12/2003 | Frame | 427/271 |
| 7,108,031 | B1 | 9/2006 | Secrest | |
| 2002/0132050 | A1 | 9/2002 | Frame | |
| 2003/0031832 | A1 | 2/2003 | Olson et al. | |
| 2006/0191222 | A1 | 8/2006 | Sabater et al. | |
| 2007/0113502 | A1 | 5/2007 | Nunn | |
| 2007/0166516 | A1 | 7/2007 | Kim et al. | |
| 2008/0226874 | A1 | 9/2008 | Kalwa | |

FOREIGN PATENT DOCUMENTS

| | | |
|---|---|---|
| CH | 602297 | 7/1978 |
| DE | 105084 | 5/1898 |
| DE | 390828 | 2/1924 |
| DE | 2527564 | 7/1976 |
| DE | 19952021 | 5/2001 |
| DE | 202006009589 | 9/2006 |
| DE | 102006024305 | 10/2007 |
| DE | 102006028245 | 12/2007 |
| DE | 102006052555 | 1/2008 |
| EP | 0017594 | 10/1980 |

(Continued)

*Primary Examiner* — Shelley Self
(74) *Attorney, Agent, or Firm* — Capitol City TechLaw

(57) ABSTRACT

A method is provided for treating the decorative face of a panel to simulate the visual effect of a distressed panel. The decorative face may include at least a layer of wood or the like. The method may involve passing the panel with respect to two or more distressing tools. The passing may be performed in an automated way by first driving means. The method may also involve advancing the distressing tools intermittently toward the moving panel to apply distress marks. The intermittently advancing may be performed in an automated way by second, third and optional further driving means. At least one of the passing of the panel and the advancing of the distressing tools toward the moving panel may be performed according to an irregular rhythm in order to obtain irregularly spaced distress marks. At least one of the first driving means, the second driving means, the third driving means, and the optional further driving means is steered by and therefore coupled to program means.

14 Claims, 3 Drawing Sheets

FOREIGN PATENT DOCUMENTS

| | | |
|---|---|---|
| EP | 0345790 | 12/1989 |
| EP | 0791480 | 8/1997 |
| EP | 1252994 | 10/2002 |
| EP | 1413411 | 4/2004 |
| EP | 1541373 | 6/2005 |
| EP | 1607178 | 12/2005 |
| EP | 1908608 | 4/2008 |
| EP | 1985464 | 10/2008 |
| EP | 2036741 | 3/2009 |
| EP | 2045363 | 4/2009 |
| EP | 2078597 | 7/2009 |
| GB | 220443 | 8/1924 |
| GB | 1097419 | 1/1968 |
| JP | 2004136596 | 5/2004 |
| JP | 2007168074 | 7/2007 |
| NL | 1013971 | 3/2000 |
| NL | 1017923 | 10/2002 |
| NL | 1021700 | 7/2003 |
| NL | 1022280 | 7/2003 |
| WO | 97/31776 | 9/1997 |
| WO | 02/06041 | 1/2002 |
| WO | 02/28665 | 4/2002 |
| WO | 02/090129 | 11/2002 |
| WO | 03/080337 | 10/2003 |
| WO | 2006/063803 | 6/2006 |
| WO | 2006/066776 | 6/2006 |
| WO | 2006/136949 | 12/2006 |
| WO | 2007/003805 | 1/2007 |
| WO | 2008/040760 | 4/2008 |
| WO | 2009/057167 | 5/2009 |

* cited by examiner

DISTRESSING PROCESS AND APPARATUS FOR APPLYING SUCH PROCESS

BACKGROUND

1. Field of the Invention

The present invention relates to a process for distressing panels, as for example floor boards.

More particularly, it is the aim of the present invention to provide a method or process for distressing the decorative face of panels which decorative face comprises a wooden layer or the like.

The present invention is applicable to any panel comprising at least a decorative layer that can be impressed. The panel may also be made of massive wood, and the layer to be impressed may be provided of coatings or the like, or coatings may be applied after the treatment according to the invention. Such coatings may comprise one or more ultraviolet or electron beam cured transparent lacquer layers, wherein preferably at least one of said lacquer layers comprises hard particles, such as aluminiumoxide or siliconcarbide particles.

Such layer to be treated may in particular have a fibrous structure, particularly wood or lumber, hardboard, particle board and the like.

The present invention is of particular interest to so-called plywood panels, that comprise three or more layers or plies of wood or veneer, that have been glued on top of each other. The gluing is preferably performed in such a way that the direction of the wood grain changes from one ply to the other. More specifically the direction of the wood grain in two adjacent layers is preferably perpendicular, such that so-called cross-linked plywood is attained. Such plywood panels are particularly dimensionally stable and very suitable to be applied in flooring. The number of plies is preferably uneven, for example equal to three or five. The impressible decorative layer of such plywood panel is preferably formed by the uppermost wood veneer layer. The uppermost wood veneer layer is preferably of a higher quality than one or more of the other plies, wherein this quality is expressed according to ANSI-HPVA HP-1-2000 and preferably equal to grade A, B or N, whereas one or more of the other plies preferably have a quality equal to grade C or D.

The present invention is also related to an apparatus for treating the decorative face of a panel to simulate the visual effect of a distressed panel, said decorative face comprising at least a layer of wood or the like.

2. Description of Related Art

It is a known practice to artificially distress floor boards.

There is a growing demand for floor boards of which the decorative surface is provided of textures simulating a rustic effect.

Floor boards are known to be treated in an automated way by means of an apparatus.

A known apparatus as disclosed in U.S. Pat. No. 3,726,328 comprises transversely spaced tools such as rotary cutters having respective lifting mechanisms controlled by a programming device.

A wood panel to be treated is passed with respect to these transversely spaced tools.

The tools are advanced intermittently toward the moving panel to distress spaced areas of the adjacent surface in a suitable pattern.

Preferably, the tools are individually advanced toward the moving panel.

The advance of the tools toward the moving panel is preferably program controlled.

A limitation of this known method and apparatus consists in the fact that the movements of the tools, linked to the movements of the panel or not, provide a pattern of distress marks.

Moreover, the mechanism being similar to a piano-mechanism and being provided of transversely spaced tools can only apply distress marks in line with these tools.

No distress marks can be applied on the positions between the transversely spaced tools. The optionally present second, third or fourth series of distressing tools with different height of cutting edge can only result in cuts with varying depth.

Although neither mentioned nor hinted, it is clear that even four series of distressing tools, even if the corresponding tools would be mutually transversely shifted, would result in maximum four series of marks all positioned on straight lines.

In case of floor boards, it is clear that when such panels are placed together to form a floor covering, the patterns and distress marks positioned in line are easily observed as being artificial.

SUMMARY

In order to solve these and other problems or limitations related with the known processes and apparatuses, the present invention relates to a method of treating the decorative face of a panel to simulate the visual effect of a distressed panel, said decorative face comprising at least a layer of wood or the like, which method comprises:

- passing the panel with respect to two or more distressing tools, the passing being performed in an automated way by means of first driving means;
- advancing said tools intermittently toward the moving panel to apply distress marks, the intermittently advancing being performed in an automated way by means of second, third and optional further driving means;
- where the passing of the panel and/or the advancing of said tools toward the moving panel is performed according to an irregular rhythm in order to obtain irregularly spaced distress marks, whereto at least one of the first driving means and the second, third and optional further driving means is steered by and therefore coupled to program means.

The irregular rhythm of the passing of the panel and/or of the advancing of said tools toward the moving panel provides for irregularly spaced distress marks.

The more distressing tools are provided, the easier the desired irregular result can be obtained.

The distressing tools can comprise or even consist of embossing rolls which provide the advantage that per distressing tool, a multitude of contact surfaces can be directed toward the panel. According to a variant the distressing tools can comprise one or more embossing belts or plates. Preferably the distressing tools are substantially made from a metal, such as steel. The distressing tools can be chromium plated.

The distressing tools are provided with an operative surface that can be put in contact with the moving panels, wherein said operative surface is structured or relieved, such that it bears protrusions having the negative elevations of distressing marks, such as chisel marks, saw cut lines, wear traces, chipped-off edges, etcetera. Such protrusions can e.g. be created on the operative surface by means of one or more etching steps and/or one/or more milling treatments. Preferably such etching and/or milling is performed on the bases of data captured from wooden panels having genuine distressing marks. Such data can be captured by optical scanning and/or by tactile scanning. In this way the invention allows transferring the distressing marks of aged flooring to fresh floor panels in a convincing way.

It is possible to group different kinds of distressing marks on the operative surface of one and the same distressing tool. It is also possible to group different kinds of distressing marks on the operative surface of different dedicated distressing tools. According to the latter possibility e.g. all chisel mark patterns could be grouped on one distressing tool, while all saw cut lines are grouped on another distressing tool.

These embossing rolls and in general the distressing tools can be provided of a width mainly corresponding the width of the panels to be treated by the apparatus, providing the option to provide distress marks at any position with respect to the side borders of a panel.

BRIEF DESCRIPTION OF THE DRAWINGS

With the intention of better showing the characteristics of the invention, hereafter, as an example without any limitative character, are described two example embodiments of the apparatus for treating the decorative face of a panel to simulate the visual effect of a distressed panel according to the invention, reference being made to the accompanying drawings, wherein.

DESCRIPTION OF EXAMPLE, NON-LIMITING EMBODIMENTS

Figure 1:
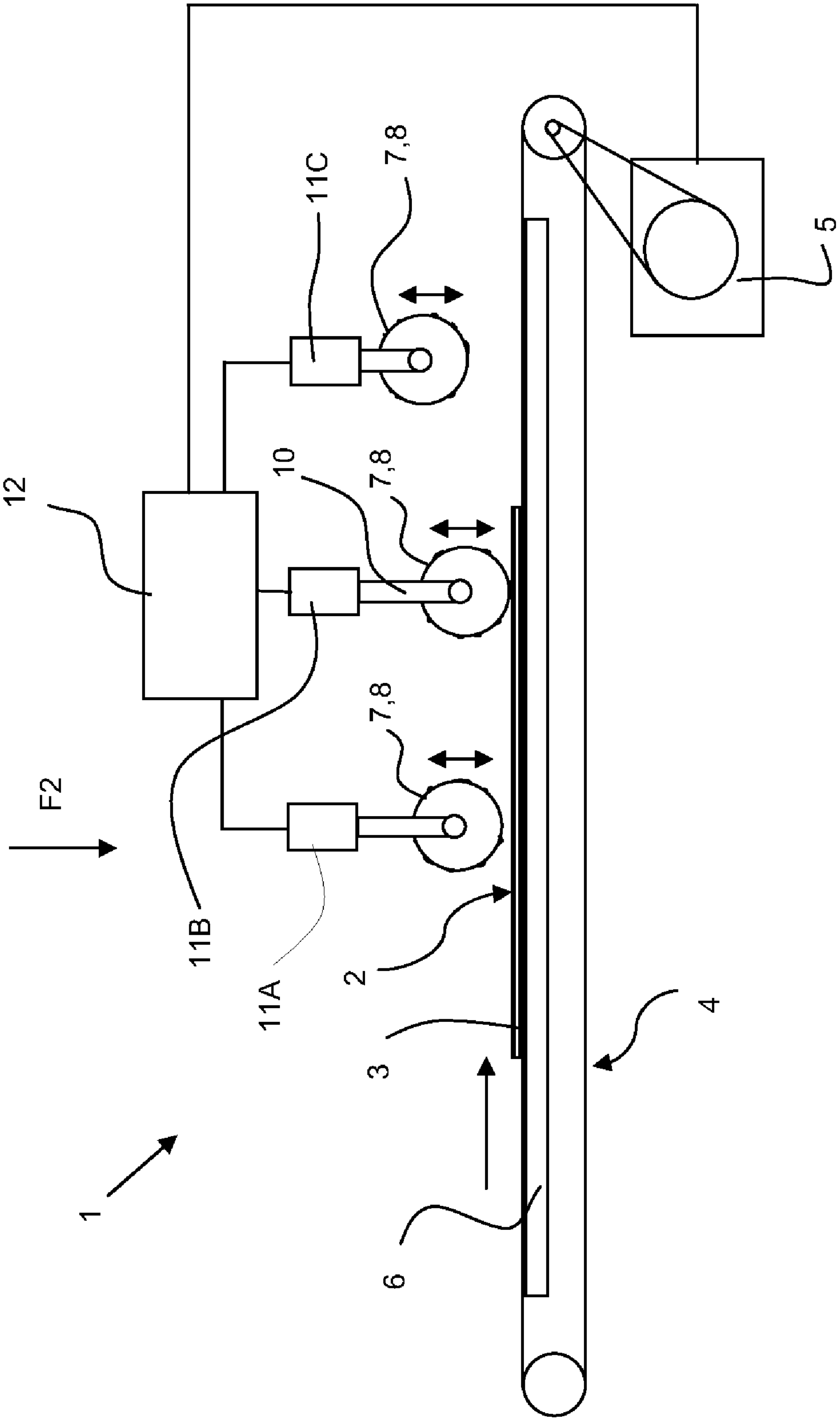
FIG. 1 represents a schematic side view of an apparatus according to the invention.
Figure 2:
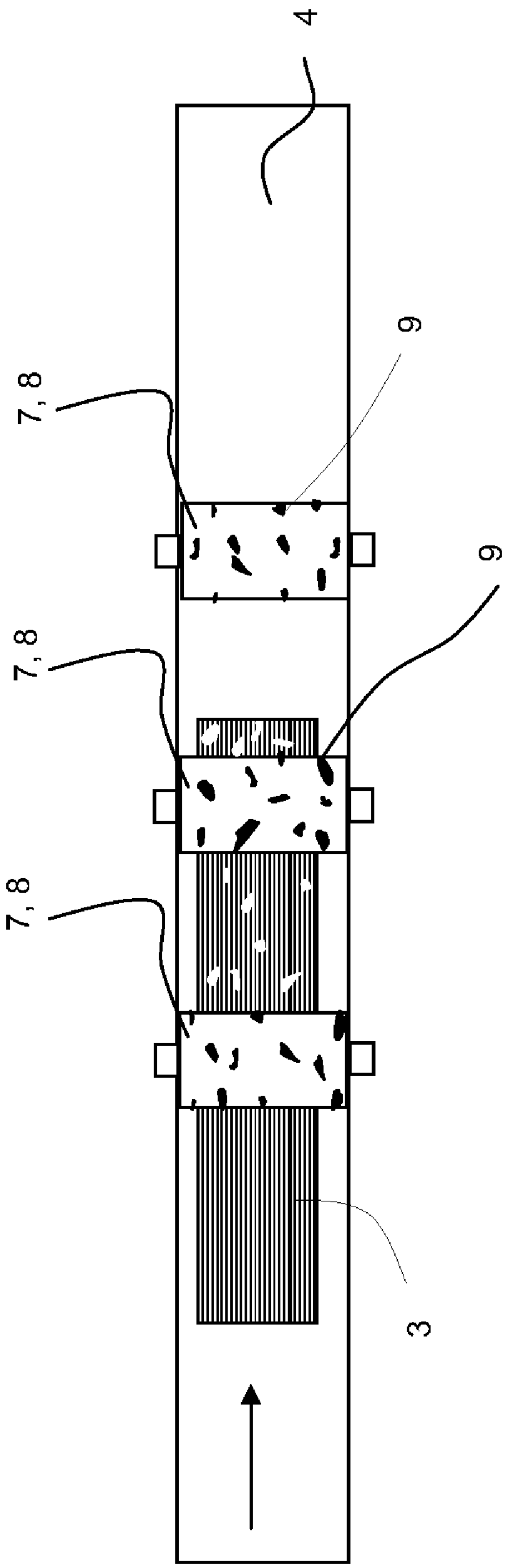
FIG. 2 represents a top view according to arrow F2 in FIG. 1.

FIGS. 1 and 2 represent in a schematic manner an apparatus 1 for treating the decorative face 2 of a panel 3 to simulate the visual effect of a distressed panel according to the invention.

For reasons of clarity, not all components represented in FIG. 1 are shown in FIG. 2.

The apparatus 1 comprises multiple conveyors 4 driven by first driving means 5, in this case an electromotor. The driving means 5 may comprise individual driving means for each conveyor.

The conveyor 4 is appropriately provided of a support table 6.

Above the conveyor 4, a series of distressing tools 7 is provided, in this case three embossing rolls 8.

These embossing rolls 8, here provided of irregularly shaped and irregularly positioned protrusions 9, are each rotatably mounted on at least vertically movable holders 10 which are thereto connected to second, third and fourth driving means 11A, 11B and 11C, in this case driven cylinders, which can e.g. be hydraulic or pneumatic.

In the represented embodiment, the first, second, third and fourth driving means 5, 11A-11C are connected to program means 12, such as a PLC or a central processing unit, which preferably is provided of a memory for storing historic processing and/or measuring data.

The program means 12 are programmed to allow the steering of each of the individual driving means 5 and 11A-11C to be performed in an irregular manner, optionally taking into account the movements of the other driving means 5 and 11A-11C.

The program means 12 are here and optionally programmed such that the passing of a panel 3 and/or the advancing of said tools 7 toward the moving panel 3 takes or take into account at least a portion of the recent passing and/or advancing movements.

Optionally, the apparatus 1 is provided of sensors, not represented in the figures, for measuring the position of panel 3 and/or for registering the applied distress marks on a panel 3.

Sensors may be provided to automatically perform a product inspection and capturing corresponding data after applying the distress marks.

The program means 12 may be programmed such that the passing of a panel 3, i.e. the steering of the first driving means 5, and/or the advancing of the tools 7 toward the moving panel 3, take into account the captured data of earlier treated panels 3 in order to avoid undesired repetition in consecutively produced panels 3, stacked and packet together and having an relatively high probability of being applied in the same application, in case of floor boards of being placed on the same floor.

The functioning of the apparatus 1 according to FIGS. 1 and 2, apart from the already discussed steering options provided by the program means 12, is as follows.

A panel 3 is placed on the conveyor 4, be it manually or by means of a cooperating apparatus.

The first driving means 5 drive the conveyor 4 such that the panel 3 is passed according to a steady progress speed with respect to the in this case three embossing rolls 8 provided of protrusions 9.

The embossing rolls 8 are intermittently advanced in an irregular manner toward the moving panel 3 to apply irregularly spaced distress marks. Thereto, the embossing rolls 8 are pressed against the decorative face 2 of the panels 3 and thereby impress or machine the said decorative face 2.

The operative surface of the distressing tools or embossing rolls 8, which is able to contact the decorative surface or face of the moving panels 3 and is provided with said protrusions 9, is preferably at maximum only partly put into contact with a particular moving panel 3. The selection of the part or portion of the operative surface of the distressing tool that is put into contact with a particular panel 3 can be left to odds, or can be programmed. Preferably such part or portion of the operative surface is smaller than the decorative surface of said particular panel 3, or even smaller than one fifth of the decorative surface of said particular panel 3.

The rotational position of the embossing rolls 8, upon advancement, can either be left at odds, or be steered to a position such that a preferred part or portion of the operative surface is put into contact with the decorative face of the panel 3. The possibility of steering to a desired rotational position allows choosing a portion of the operative surface to be put into contact with the moving panel. This possibility is especially interesting when larger distinctive distressing marks are to be applied. The possibility of leaving the rotational position at odds raises the irregularity of the obtained structures and is especially interesting when a series of smaller distressing marks is to be applied, for example a series of pits, scratches. In such case the obtained series of smaller distressing marks can form part of a larger series of small protrusions 9 at the operative surface of the embossing roll 8. It is clear that also the position of distressing tools, other than embossing rolls, can either be steered or left at odds such that similar possibilities are obtained.

The irregular movements caused by each of the driving means 11A-11C preferably take into account the movements of the other embossing rolls 8 and/or of the panel 3. In other words, the passing of the panel and/or the advancing of said tools toward the moving panel takes or take into account their mutual movements, optionally by means of the program means.

The movements of the other embossing rolls 8 and/or of the panel 3 can optionally be deducted from the steering data of the corresponding driving means 5 and/or 11A-11C respectively.

Alternatively, the optionally present sensors may alone or as a complementary input provide the required data thereto.

Alternatively, the first driving means 5 can be steered such that a panel 3 is passed according to an irregular progress speed.

Thanks to the multiple distressing tools 7, in this case embossing rolls 8 each providing a multitude of possible contact surfaces, a large or almost infinite amount of possible combinations of distress marks can be obtained.

In the above example, three distressing tools 7 are provided. It is clear that more or less than three distressing tools 7 may be provided. The more distressing tools 7 provided, the larger the amount of possible combinations that can be realized in practice. Satisfying results have been obtained with four distressing tools 7.

The protrusions 9 being shaped and spaced in an irregular manner over the entire width of the embossing rolls 8, the width of the embossing rolls 8 mainly corresponding the width of the panels 3 to be treated by the apparatus, allow to provide distress marks at any position with respect to the side borders of a panel 3 and which are mutually not aligned.

It is clear that the protrusions 9 can be provided of mutually differing height.

In order to obtain irregularly spaced distress marks, it is clear that it would be sufficient to have at least one of the first driving means 5 and the second, third and fourth driving means 11A-11C to be steered by and therefore to be coupled to the program means 12.

In the figures, a panel 3 is oriented lengthwise when passing the panel 3 with respect to the distressing tools 7, but other orientations can be considered.

Figure 3:
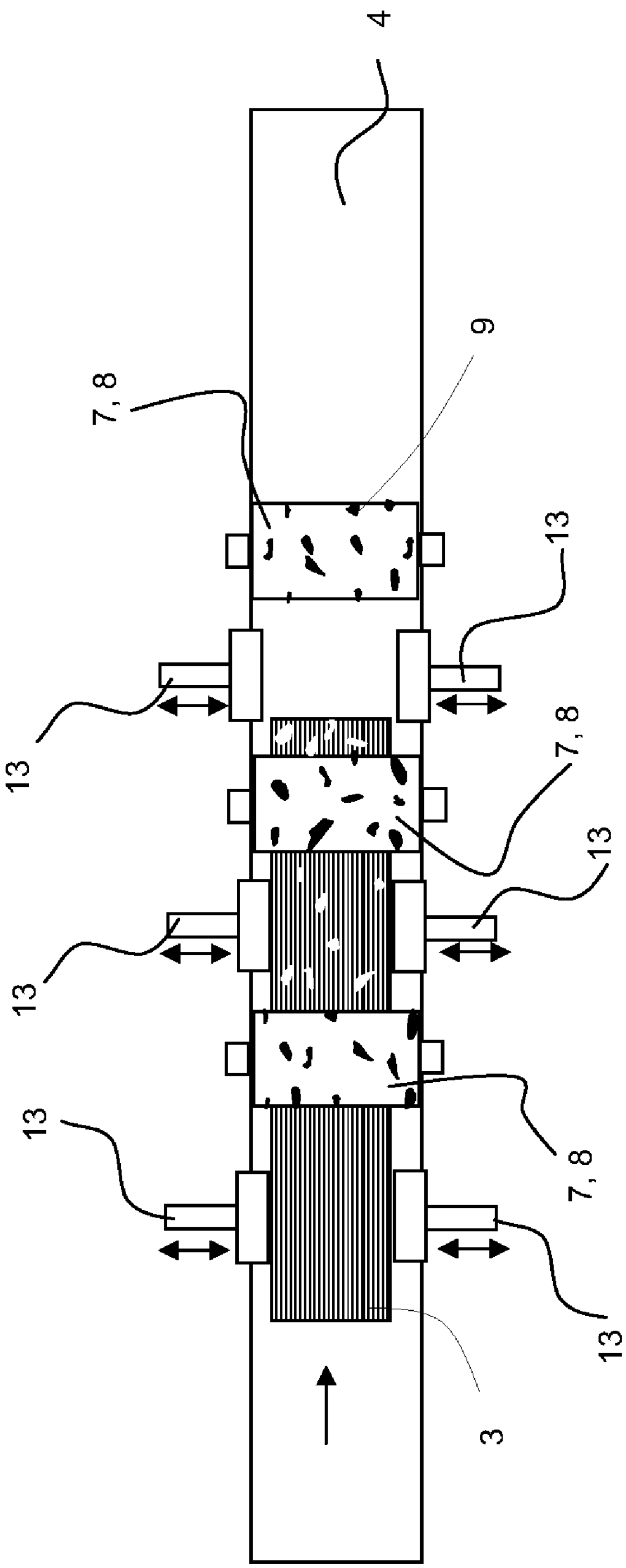
FIG. 3 represents a corresponding view as represented in FIG. 2, in this case of an alternative apparatus according to the invention.

In FIG. 3, a top view is represented of an alternative apparatus 1 according to the invention, which only differs from the apparatus according to FIGS. 1 and 2 in that automatically driven aligning means 13 for aligning a panel 3 are provided.

The extra degree of freedom allows to further enlarge the amount of possible combinations of distress marks that can be realized by a given apparatus.

The corresponding driving means, for clarity reasons not represented in FIG. 3, may be connected to the program means 12 and may be driven in an irregular manner, optionally also taking into account the other process parameters.

It is clear that any of the said irregular rhythms may be a random rhythm, resulting in randomly spaced distress marks.

The depth of the obtained distressing marks at the face of the panel 3 is preferably limited. In the case the panels is a plywood panel with an uppermost decorative ply or another panel having a core and a decorative wood layer at the face, the depth of the distressing marks is preferably less than the thickness of said decorative layer, and even better less than half this thickness.

In the event the panels are provided with a transparent surface coating, such as or several lacquer layers, the thickness of this coating is preferably smaller than the depth of the distressing marks, such that a tactile structure is present at the face of the eventually obtained finished panels. The provision of at least one of said lacquer layers after the provision of the distressing marks offers the advantage that the distressing marks are in effect secured from wear, such that such distressing marks do not necessarily form preferential instances of premature wearing of the panels. After the provision of said distressing marks preferably at least one hard particles containing transparent layer is applied.

It is clear that the invention also relates to floor panels or other panels obtained by such method, as well as to floor coverings or other coverings assembled from such panels. It is clear that such covering shows the advantage that distressing marks are irregularly scattered over the floor covering, thereby raising the naturally aged look of such floor covering. Such covering preferably comprises panels having a wooden decorative surface layer, said decorative surface layer being provided with one or more distressing marks, wherein said covering comprises at least two panels with respective decorative surface layers having an identical distressing mark; said distressing mark being positioned at different locations with respect to the edges of the respective panels.

The invention also relates to a packaged set of rectangular floor panels having edges, wherein each floor panel comprises a wooden decorative surface layer, said decorative surface layer being provided with one or more distressing marks, wherein said packaged set comprises at least two floor panels with respective decorative surface layers having an identical distressing mark; said distressing mark being positioned at different locations with respect to the edges of the respective floor panels. Said difference in location preferably at least comprises a different position in the longitudinal direction of the panel and/or a different position in the width direction of the panel, in which case said panels are preferably oblong.

The panels of the invention are preferably provided with coupling means at the edges of at least two and preferably all opposite sides, such that these panels can be coupled at the respective sides to similar panels by engaging the coupling means. Such coupling means are preferably of the type that allows obtaining a coupling in all directions of the plane perpendicular to said sides, such as a so-called click, snap, angling-in, or push lock connection.

The invention is in no way limited to the embodiments described above and represented in the appended drawings, as an apparatus for treating the decorative face of a panel to simulate the visual effect of a distressed panel and the corresponding method can be realized in various ways without departure from the scope of the invention.

What is claimed is:

1. A method of treating the decorative face of a panel to simulate the visual effect of a distressed panel, the decorative face comprising at least a layer of wood, the method comprising:

passing the panel with respect to two or more distressing tools, the passing being performed in an automated way by first driving means; and advancing the distressing tools intermittently toward the moving panel to apply distress marks, the intermittently advancing being performed in an automated way by second driving means and third driving means;

wherein at least one of the passing of the panel and the advancing of the distressing tools toward the moving panel is performed according to an irregular rhythm in order to obtain irregularly spaced distress marks, and wherein at least one of the first driving means, the second driving means, and the third driving means is steered by and therefore coupled to program means.

2. The method as claimed in claim 1 wherein at least one of the passing of the panel and the advancing of the distressing tools toward the moving panel takes into account their mutual movements.

3. The method as claimed in claim 1 wherein at least one of the passing of the panel and the advancing of the distressing tools toward the moving panel takes into account at least one of a portion of the recent passing movements and a portion of the recent advancing movements.

4. The method as claimed in claim 3 wherein an automated product inspection and corresponding data capturing is performed after applying the distress marks, and wherein at least one of the passing of the panel and the advancing of the distressing tools toward the moving panel takes into account the captured data of earlier treated panels.

5. The method as claimed in claim 1 wherein the panel is oriented lengthwise when passing the panel with respect to the distressing tools.

6. The method as claimed in claim 1 wherein the panel is oriented crosswise when passing the panel with respect to the distressing tools.

7. The method as claimed in claim 1 wherein at least one of the passing of the panel and the advancing of the distressing tools toward the moving panel is performed according to a random rhythm in order to obtain randomly spaced distress marks.

8. An apparatus for treating the decorative face of a panel to simulate the visual effect of a distressed panel, said decorative face comprising at least a layer of wood, the apparatus comprising:

two or more distressing tools;

first driving means for passing the panel with respect to the two or more distressing tools;

second driving means and third driving means for advancing the distressing tools intermittently toward the moving panel to apply distress marks; and program means coupled for steering purposes to at least one of the first driving means, the second driving means, and the third driving means for allowing at least one of the passing of the panel and the advancing of the distressing tools toward the moving panel to be performed according to an irregular rhythm in order to obtain irregularly spaced distress marks.

9. The apparatus as claimed in claim 8 wherein the program means, coupled for steering purposes to at least one of the first, second, and third driving means, is also coupled for data gathering purposes to at least one of the other driving means in order to take into account their mutual movements.

10. The apparatus as claimed in claim 9 wherein the program means is connected to a memory for storing at least one of portions of recent passing movements and portions of recent advancing movements, and wherein the program means takes at least portions of these data into account when steering at least one of the driving means.

11. The apparatus as claimed in claim 9, further comprising:

automated product inspection means, which is located downstream from the distressing tools, for capturing data; and a memory for storing at least a portion of the captured data;

wherein the program means is connected to the memory for taking at least portions of the captured data into account when steering at least one of the driving means.

12. The apparatus as claimed in claim 8 wherein the distressing tools are embossing rolls.

13. The apparatus as claimed in claim 8 wherein the distressing tools are provided on a tooling surface of which the width corresponds to the width of a panel to be treated.

14. The apparatus as claimed in claim 13 wherein the distressing tools are provided of a tooling surface of which the width is a value in the range of six to thirty centimeters.

* * * * *